(12) United States Patent
Ren et al.

(10) Patent No.: US 10,989,615 B2
(45) Date of Patent: Apr. 27, 2021

(54) NON-DESTRUCTIVE MONITORING METHOD FOR INTERNAL PRESSURE INTENSITY OF PIPELINE

(71) Applicant: DALIAN UNIVERSITY OF TECHNOLOGY, Liaoning (CN)

(72) Inventors: Liang Ren, Liaoning (CN); Jiajian Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/963,158

(22) PCT Filed: Jul. 16, 2019

(86) PCT No.: PCT/CN2019/096181
§ 371 (c)(1),
(2) Date: Jul. 17, 2020

(87) PCT Pub. No.: WO2020/140418
PCT Pub. Date: Jul. 9, 2020

(65) Prior Publication Data
US 2021/0033480 A1    Feb. 4, 2021

(30) Foreign Application Priority Data
Jan. 3, 2019    (CN) .......................... 201910003231.0

(51) Int. Cl.
*G01L 11/02*    (2006.01)
*G01L 1/24*    (2006.01)
(Continued)

(52) U.S. Cl.
CPC .............. *G01L 11/025* (2013.01); *G01F 1/00* (2013.01); *G01F 1/20* (2013.01); *G01F 7/005* (2013.01); *G01L 1/246* (2013.01); *G01P 5/001* (2013.01)

(58) Field of Classification Search
CPC .............................. G01L 11/025; G01L 1/246
See application file for complete search history.

(56) References Cited

U.S. PATENT DOCUMENTS

| 6,276,215 B1 | 8/2001 | Berg |
| 2016/0230535 A1* | 8/2016 | Sobolewski .............. F16L 3/10 |
| 2019/0003499 A1* | 1/2019 | Logan .................. G01M 11/086 |

FOREIGN PATENT DOCUMENTS

| CN | 2567548 Y | 8/2003 |
| CN | 101769442 A | 7/2010 |

(Continued)

OTHER PUBLICATIONS

Liang, Ren et al., "Gas Pipeline Leakage Monitoring Test Based on Hoop Strain", Vibration, Test and Diagnosis, Oct. 1, 2015, vol. 35, Issue No. 5, p. 820-825, 987.

*Primary Examiner* — Paul M. West
(74) *Attorney, Agent, or Firm* — Muncy, Geissler, Olds & Lowe, P.C.

(57) ABSTRACT

A non-destructive monitoring method for internal pressure intensity of a pipeline. The method establishes an equation relationship by the fact that the variation of the internal diameter of the pipeline is the same as that measured by FBG sensors, and can effectively obtain the value of the internal pressure intensity of the pipeline by measuring the strain values of the FBG sensors installed on the pipeline so as to monitor the internal pressure intensity of the pipeline. The present invention has the advantages of simple principle, convenient installation, no damage to pipeline structure, long-distance real-time on-line monitoring and the like, and can measure the pressure intensity of various pipelines with different diameters by changing the calibration distance of sensors and the dimension of sensor clamps. This can complete non-destructive, real-time and accurate monitoring on the internal pressure intensity of the pipeline.

1 Claim, 2 Drawing Sheets

(51) Int. Cl.
*G01F 1/00* (2006.01)
*G01F 1/20* (2006.01)
*G01F 7/00* (2006.01)
*G01P 5/00* (2006.01)

(56) References Cited

FOREIGN PATENT DOCUMENTS

| | | | |
|---|---|---|---|
| CN | 101793573 A | | 8/2010 |
| CN | 105973162 A | | 9/2016 |
| CN | 107884114 A | | 4/2018 |
| CN | 108369118 A | | 8/2018 |
| CN | 109520666 A | | 3/2019 |
| DE | 19808222 A1 | | 9/1999 |
| GB | 2457277 A | * | 8/2009 ............. G01B 5/025 |

* cited by examiner

NON-DESTRUCTIVE MONITORING METHOD FOR INTERNAL PRESSURE INTENSITY OF PIPELINE

TECHNICAL FIELD

The present invention belongs to the technical field of optical fiber sensing and relates to a non-destructive monitoring method for internal pressure intensity of a pipeline.

BACKGROUND

With the rapid development of industrial economy, the demand for resources such as petroleum and natural gas which are vital to human development continuously increases. With the advantages of low cost, energy saving, high safety, stable supply and the like, the pipeline can be used for long-distance transportation of petroleum and natural gas and thus its usage is also on the increase. In order for the media in the pipeline to be transported normally, it is essential to apply appropriate pressure intensity in the pipeline. However, on one hand, pressure intensity that is too high makes the pipeline unable to withstand excessive pressure and thus damaged, shortening the service life of the pipeline; on the other hand, pressure intensity that is too low makes the pipeline unable to transport the media normally, increasing the economic cost. Therefore, real-time monitoring on the internal pressure intensity at key joints of the pipeline can ensure the safe and effective operation of the pipeline and enhance the overall economic benefit.

At present, the main methods of measuring the internal pressure intensity of the pipeline are a method of measurement by installing a pressure gage and a method of measurement by installing a pressure transmitter. For the above two methods, it is necessary to form an opening in the pipeline to connect the pressure gage or the pressure transmitter to the pipeline structure through a valve so as to measure the internal pressure intensity of the pipeline. The two methods both cause damage to the pipeline structure and have potential safety hazards for the long-term operation of the pipeline in the future, and the pressure measurement device is not easy to replace once damaged. In addition, manual reading is required for the value of the internal pressure intensity of the pipeline measured by the method of measurement by installing a pressure gage, which not only consumes manpower but also cannot monitor the change of the internal pressure intensity of the pipeline in real time. The pressure transmitter is an electrical sensor. Although it can solve the problem of manual monitoring of pressure intensity data, it is extremely flammable for petroleum and natural gas pipelines, petroleum and natural gas. The installation and use of electrical sensors on such pipelines still pose a risk of flammability and explosion to the pipelines.

In recent years, with the successful application of the optical fiber sensing technology in safety monitoring of the fields such as military, aviation and infrastructure, the optical fiber sensing technology is also introduced into pipeline monitoring. The fiber bragg grating (FBG) sensor has the advantages of anti-electromagnetic interference, no direct use of power, high sensitivity, easy realization of long-distance signal collection and the like, and can achieve accurate and real-time monitoring on the internal pressure intensity of the pipeline.

SUMMARY

To solve the above problem, the present invention provides a non-destructive monitoring method for internal pressure intensity of a pipeline. In the premise of not damaging the pipeline and not affecting the normal operation of the pipeline, the method establishes an equation relationship by the fact that the variation of the internal diameter of the pipeline is the same as that measured by FBG sensors, and can effectively obtain the value of the internal pressure intensity of the pipeline by measuring the strain values of the FBG sensors installed on the pipeline so as to monitor the internal pressure intensity of the pipeline. The monitoring method does not damage the pipeline structure or directly use power, has high sensitivity, and can realize long-distance and real-time collection of pressure intensity values. The corresponding sensor calibration distance and sensor clamp are designed according to the dimension of the pipeline to be measured so as to measure the pressure intensity of various pipelines with different diameters. The sensor has simple installation method and is convenient for installation.

The technical solution of the present invention is:

A non-destructive monitoring method for internal pressure intensity of a pipeline establishes an equation relationship by the fact that the variation of the internal diameter of the pipeline is the same as that measured by FBG sensors to obtain the relationship between the internal pressure intensity of the pipeline and the strain values measured by the FBG sensors; and obtains the internal pressure intensity of the pipeline by measuring the strain values of the FBG sensors installed on the pipeline to conduct non-destructive monitoring on the internal pressure intensity of the pipeline. The details are as follows:

During operation, the internal pressure intensity of the pipeline acts on the pipeline wall, causing the internal diameter of the pipeline to change. Since the pipeline is generally used for long-distance transportation, and the length of the pipeline is much greater than the wall thickness of the pipeline, the influence of the wall thickness can be neglected. It can be known from the basic principles of material mechanics, the stress state of any point of the pipeline is:

Hoop stress:

$$\sigma_1 = \frac{Pd}{2\delta},$$

axial stress:

$$\sigma_2 = \frac{Pd}{4\delta},$$

and radial stress: $\sigma_3 = -P$;

wherein P is the internal pressure intensity of the pipeline, d is the outside diameter of the pipeline, and $\delta$ is the wall thickness of the pipeline.

The increment $\Delta d$ of the internal diameter of the pipeline is:

$$\Delta d = d \cdot \varepsilon_1 = d \cdot \frac{1}{E} \cdot (\sigma_1 - \nu \sigma_2) \qquad (1)$$

wherein E is the Young's modulus of the pipeline material, and $\nu$ is the Poisson's ratio.

$\sigma_1$ and $\sigma_2$ are substituted into formula (1) to obtain the relationship between the increment of the internal diameter of the pipeline and the internal pressure intensity of the pipeline as follows:

$$\Delta d = \left( \frac{2d^2 - \upsilon d^2}{4E\delta} \right) \cdot P \tag{2}$$

The increment of the internal diameter of the pipeline is realized by measuring the strain values of the FBG sensors. The sensor clamps and the outer wall of the pipeline are in close fitting, and the FBG sensors are installed on the sensor clamps so that the increment of the internal diameter of the pipeline is the same as the variation measured by the FBG sensors. The variation measured by the FBG sensors is:

$$\Delta d = \varepsilon \cdot L \tag{3}$$

wherein $\varepsilon$ is the strain value measured by the FBG sensors, and L is the calibration distance of the FBG sensors.

Formula (2) and formula (3) are combined to eliminate $\Delta d$ to obtain the relationship between the internal pressure intensity of the pipeline and the strain values measured by the FBG sensors as follows:

$$P = \left( \frac{4E\delta L}{2d^2 - \upsilon d^2} \right) \cdot \varepsilon \tag{4}$$

After the pipeline structure is determined, the elastic modulus E of the pipeline, Poisson's ratio $\upsilon$, the outside diameter d of the pipeline, and the wall thickness $\delta$ of the pipeline are determined values; After the FBG sensors are selected, the calibration distance L of the FBG sensors are also a determined value. Therefore, it can be known from formula (4) that the internal pressure intensity of the pipeline is finally obtained by monitoring the strain values measured by the FBG sensors.

The installation method for the FBG sensors is as follows:

The diameter of arc of the contact surface of the sensor clamps and the pipeline is the same as the outside diameter of the pipeline, and the two sensor clamps are symmetrically pasted on the surface of the pipeline with epoxy resin glue; a groove is respectively formed in both ends of the sensor clamps; both ends of the FBG sensors are respectively installed on the groove ends of the two sensor clamps, and both ends of the FBG sensors are in the same level; a FBG sensor is respectively installed on the upper and lower ends of the sensor clamps, and the spacing between the groove ends of the two sensor clamps is the calibration distance of the FBG sensors; and sensor clamp cover plates are installed on the groove ends of the sensor clamps and tightened with screws, and the FBG sensors are fixed on the sensor clamps.

The present invention has the following effects and benefits: the method of monitoring the internal pressure intensity of the pipeline by obtaining the strain values of the FBG sensors of the present invention has the advantages of simple principle, convenient installation, no damage to pipeline structure, long-distance real-time on-line monitoring and the like; the present invention can measure the pressure intensity of various pipelines with different diameters by changing the calibration distance of sensors and the dimension of sensor clamps; and the present invention can complete non-destructive, real-time and accurate monitoring on the internal pressure intensity of the pipeline, and have positive signifi-cance to improve the safe operation of the pipeline structure and enhance the overall economic benefit.

In the figures: 1 sensor clamp; 2 sensor clamp cover plate; and 3 FBG sensor.

DETAILED DESCRIPTION

Specific embodiments of the present invention are described below in detail in combination with the technical solution and accompanying drawings.

Figure 1:
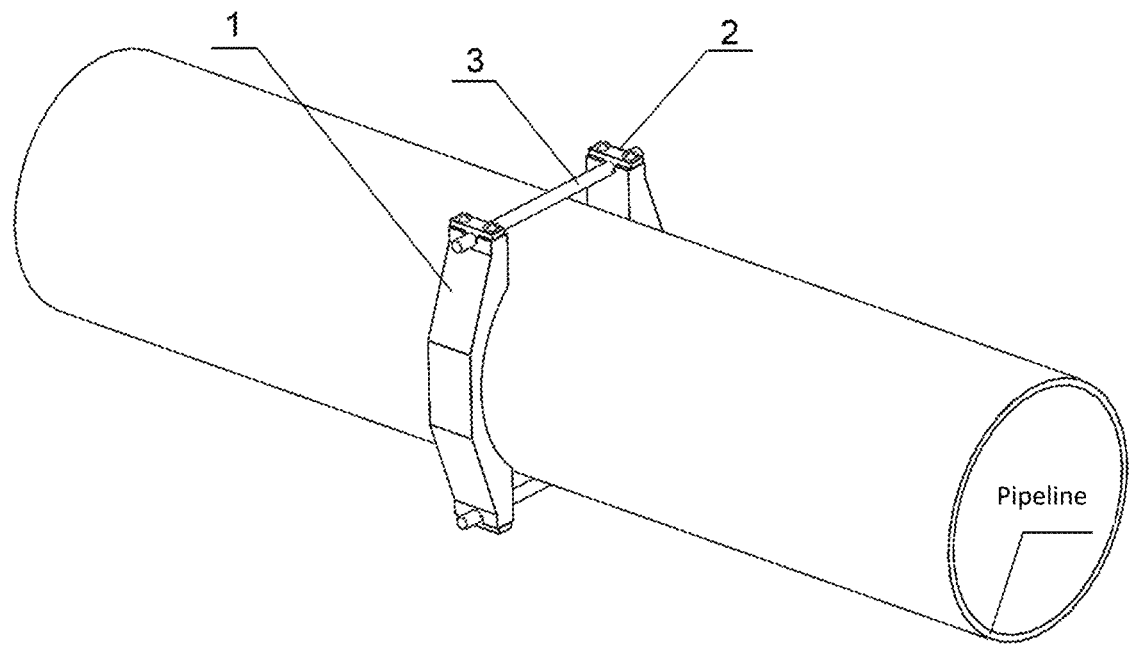
FIG. 1 is a schematic diagram of installation of a FBG sensor.
Figure 2:
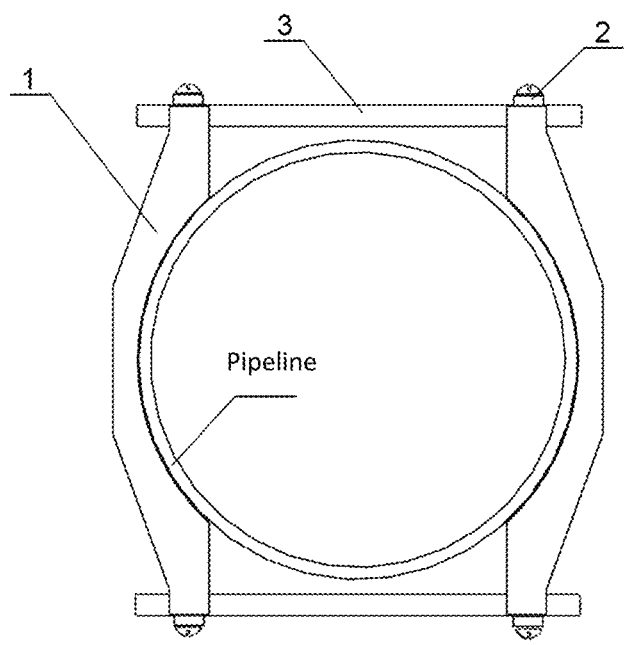
FIG. 2 is a schematic diagram of a cross section of a pipeline.

The schematic diagrams of a non-destructive monitoring method for internal pressure intensity of the pipeline provided by the present invention are shown in FIG. 1 and FIG. 2. The specific steps of the installation method for the FBG sensors 3 are as follows:

Step 1: Making sensor clamps 1 according to the diameter of the pipeline to be measured. The diameter of arc of the contact surface of the sensor clamps 1 and the pipeline is the same as the outside diameter of the pipeline to ensure a larger contact area between the sensor clamps 1 and the surface of the pipeline so as to prevent the sensor clamps 1 from loosening due to poor pasting. A groove is respectively formed in both ends of the sensor clamps 1 and used for installing the FBG sensors 3.

Step 2: Pasting the sensor clamps 1 on the surface of the pipeline with epoxy resin glue. The two sensor clamps 1 are symmetrically pasted to ensure that both ends of the FBG sensors 3 are respectively installed in the grooves of the two sensor clamps 1, and both ends of the FBG sensors 3 are in the same level, avoiding the measurement error caused by the installation angle of the FBG sensors 3.

Step 3: After the epoxy resin glue is solid, installing a FBG sensor 3 respectively on the upper and lower ends of the sensor clamps 1, and averaging the strain values measured by the upper and lower FBG sensors 3 to make the measurement result more accurate; and respectively installing sensor clamp cover plates 2 on the ends of the sensor clamps 1 and tightening with screws to fix the FBG sensors 3 on the sensor clamps 1.

Figure 3:
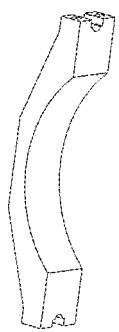
FIG. 3 is a schematic diagram of a sensor clamp.
Figure 4:
FIG. 4 is a schematic diagram of a sensor clamp cover plate.

The structures of the sensor clamps 1 and the sensor clamp cover plates 2 are shown in FIG. 3 and FIG. 4.

The invention claimed is:

1. A non-destructive monitoring method for internal pressure intensity of a pipeline, comprising:
    establishing an equation relationship by the fact that a variation of an internal diameter of the pipeline is the same as that measured by fiber bragg grating (FBG) sensors to obtain a relationship between the internal pressure intensity of the pipeline and strain values measured by the FBG sensors;
    obtaining the internal pressure intensity of the pipeline by measuring the strain values of the FBG sensors installed on the pipeline to conduct non-destructive monitoring on the internal pressure intensity of the pipeline,
    wherein a stress state of any point of the pipeline is:
    hoop stress:

$$\sigma_1 = \frac{Pd}{2\delta},$$

axial stress:

$$\sigma_2 = \frac{Pd}{4\delta},$$

and radial stress: $\sigma_3 = -P$,
wherein P is the internal pressure intensity of the pipeline, d is an outside diameter of the pipeline, and $\delta$ is a wall thickness of the pipeline,
wherein an increment $\Delta d$ of the internal diameter of the pipeline is:

$$\Delta d = d \cdot \varepsilon_1 = d \cdot \frac{1}{E} \cdot (\sigma_1 - \upsilon\sigma_2) \qquad (1)$$

wherein E is the Young's modulus of a pipeline material, and $\nu$ is the Poisson's ratio;
obtaining a relationship between the increment of the internal diameter of the pipeline and the internal pressure intensity of the pipeline as defined in formula (2) by substituting $\sigma_1$ and $\sigma_2$ into formula (1):

$$\Delta d = \left(\frac{2d^2 - \upsilon d^2}{4E\delta}\right) \cdot P \qquad (2)$$

measuring the strain values of the FBG sensors to realize the increment of the internal diameter of the pipeline, wherein sensor clamps and an outer wall of the pipeline are in close fitting, and the FBG sensors are installed on the sensor clamps so that the increment of the internal diameter of the pipeline is the same as the variation measured by the FBG sensors, wherein the variation measured by the FBG sensors is defined in formula (3):

$$\Delta d = \varepsilon \cdot L \qquad (3)$$

wherein $\varepsilon$ is the strain value measured by the FBG sensors, and L is a calibration distance of the FBG sensors;
obtaining the relationship between the internal pressure intensity of the pipeline and the strain value measured by the FBG sensors as defined in formula (4) by combining formula (2) and formula (3) to eliminate $\Delta d$:

$$P = \left(\frac{4E\delta L}{2d^2 - \upsilon d^2}\right) \cdot \varepsilon \qquad (4)$$

obtaining the internal pressure intensity of the pipeline by monitoring the strain values measured by the FBG sensors; and
installing the FBG sensors, comprising:
pasting two sensor clamps symmetrically on a surface of the pipeline with epoxy resin glue, wherein a diameter of an arc of a contact surface of the sensor clamps and the pipeline is the same as the outside diameter of the pipeline;
forming a groove respectively in both ends of the sensor clamps;
installing the both ends of the FBG sensors respectively on groove ends of the two sensor clamps, wherein the both ends of the FBG sensors are in the same level;
installing the FBG sensor respectively on upper and lower ends of the sensor clamps, wherein a spacing between the groove ends of the two sensor clamps is the calibration distance of the FBG sensors; and
installing sensor clamp cover plates on the groove ends of the sensor clamps and tightening with screws, wherein the FBG sensors are fixed on the sensor clamps.

* * * * *